(12) United States Patent
Adachi et al.

(10) Patent No.: US 11,129,079 B2
(45) Date of Patent: Sep. 21, 2021

(54) WIRELESS RELAY APPARATUS AND WIRELESS RELAY METHOD

(71) Applicant: KABUSHIKI KAISHA TOSHIBA, Tokyo (JP)

(72) Inventors: Tomoko Adachi, Kanagawa (JP); Miyuki Ogura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 111 days.

(21) Appl. No.: 16/558,458

(22) Filed: Sep. 3, 2019

(65) Prior Publication Data

US 2020/0178152 A1    Jun. 4, 2020

(30) Foreign Application Priority Data

Nov. 30, 2018  (JP) .............................. JP2018-225708

(51) Int. Cl.
| | | |
|---|---|---|
| *H04B 7/14* | (2006.01) | |
| *H04W 40/22* | (2009.01) | |
| *H04W 28/06* | (2009.01) | |
| *H04L 12/721* | (2013.01) | |

(52) U.S. Cl.
CPC ............. *H04W 40/22* (2013.01); *H04L 45/72* (2013.01); *H04W 28/06* (2013.01)

(58) Field of Classification Search
CPC ...... H04W 84/047; H04W 40/22; H04B 7/15; H04B 7/2606
See application file for complete search history.

(56) References Cited

U.S. PATENT DOCUMENTS

| | | |
|---|---|---|
| 5,982,762 A | 11/1999 | Anzai et al. |
| 2009/0010199 A1 | 1/2009 | Adachi et al. |
| 2013/0155876 A1 | 6/2013 | Potra et al. |

(Continued)

FOREIGN PATENT DOCUMENTS

| | | |
|---|---|---|
| JP | H08265358 A | 10/1996 |
| JP | 4427567 B2 | 7/2007 |

(Continued)

OTHER PUBLICATIONS

Part 11: Wireless LAN Medium Access Control (MAC) and Physical Layer (PHY) Specifications, IEEE Standard for Information technology—Telecommunications and information exchange between systems—Local and metropolitan area networks—Specific requirements, IEEE Std 802.11TM-2016, 2016, 1-3532.

(Continued)

*Primary Examiner* — Bo Hui A Zhu
(74) *Attorney, Agent, or Firm* — Holtz, Holtz & Volek PC

(57) ABSTRACT

According to one embodiment, a wireless relay apparatus includes a first MAC processor, a second MAC processor and a processor. The processor determines whether a route for relaying an IP packet via at least one of a first wireless apparatus and a second wireless apparatus is established. The processor, if a first IP packet is received before the route is established, and if the destination of the first IP packet is not the first wireless apparatus or the second wireless apparatus, and if the first IP packet is further transferred by the first wireless apparatus or the second wireless apparatus, does not transfer the first IP packet to the first wireless apparatus or the second wireless apparatus.

20 Claims, 9 Drawing Sheets

(56) References Cited

U.S. PATENT DOCUMENTS

2018/0013665 A1* 1/2018 Ko ........................ H04L 45/32
2019/0068489 A1* 2/2019 Shekhar ................. H04L 47/32
2020/0344664 A1* 10/2020 Tang ..................... H04L 69/322

FOREIGN PATENT DOCUMENTS

| JP | 2008054160 A | 3/2008 |
|----|--------------|--------|
| JP | 2009017144 A | 1/2009 |
| JP | 2015502125 A | 1/2015 |
| JP | 6208684 B2 | 9/2017 |

OTHER PUBLICATIONS

Part 2: Logical Link Control, IEEE Standard for Information technology—Telecommunications and information exchange between systems—Local and metropolitan area networks—Specific requirements, ANSI/IEEE Std 802.2, 1998.

* cited by examiner

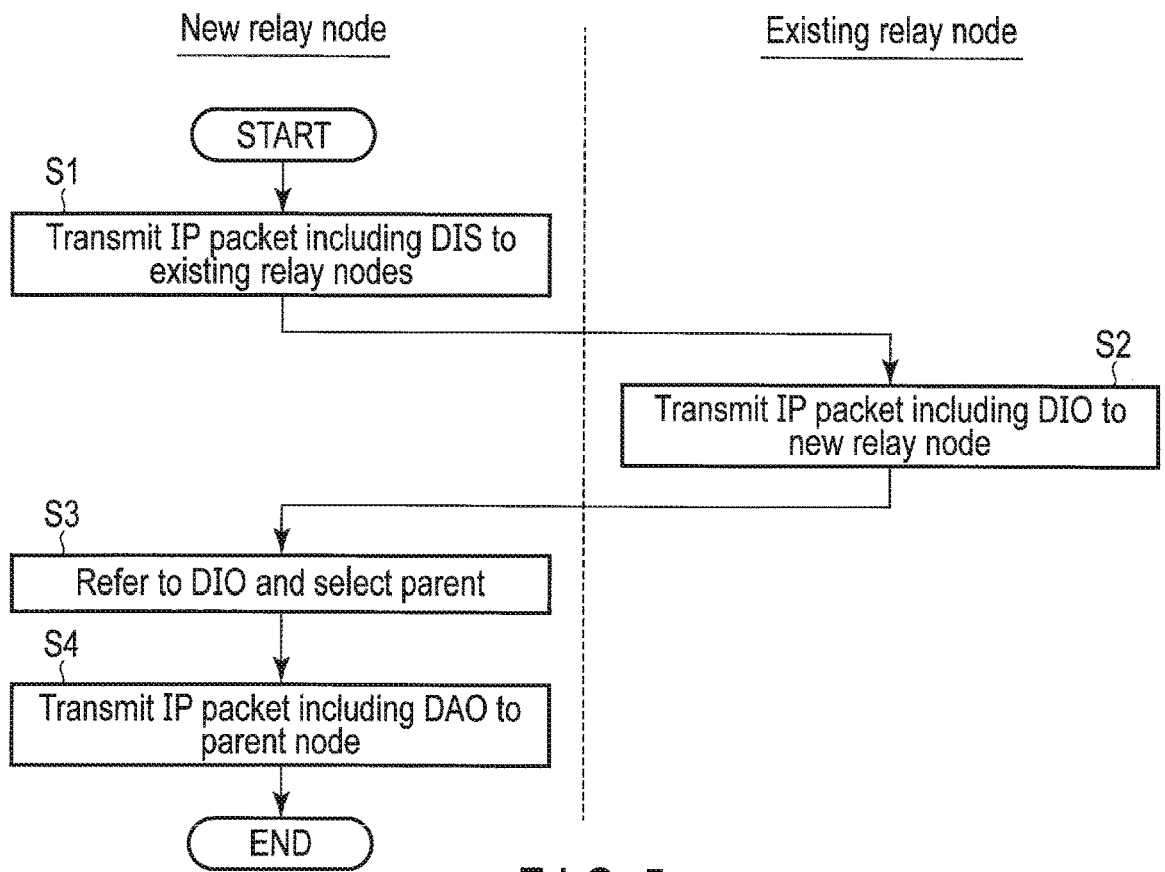
F I G. 5
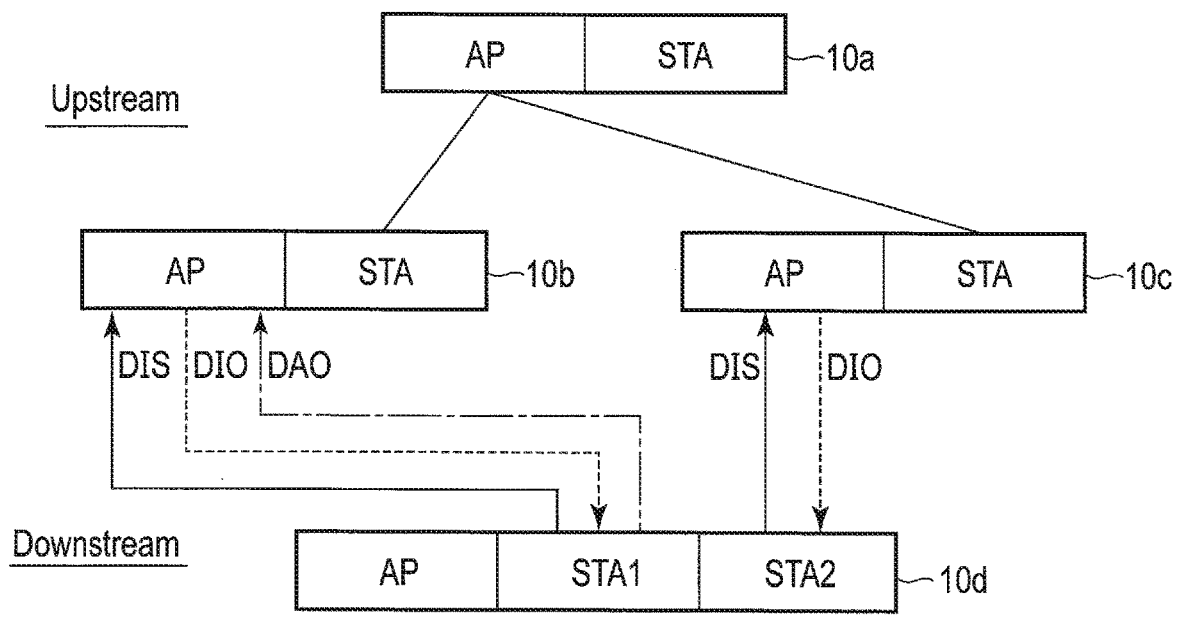
F I G. 6

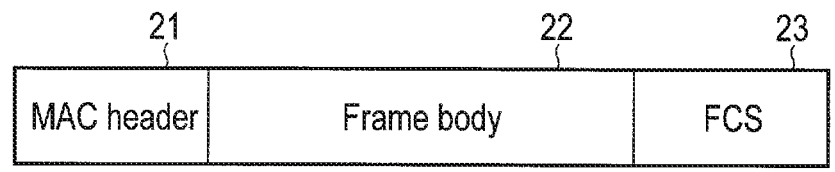
F I G. 7
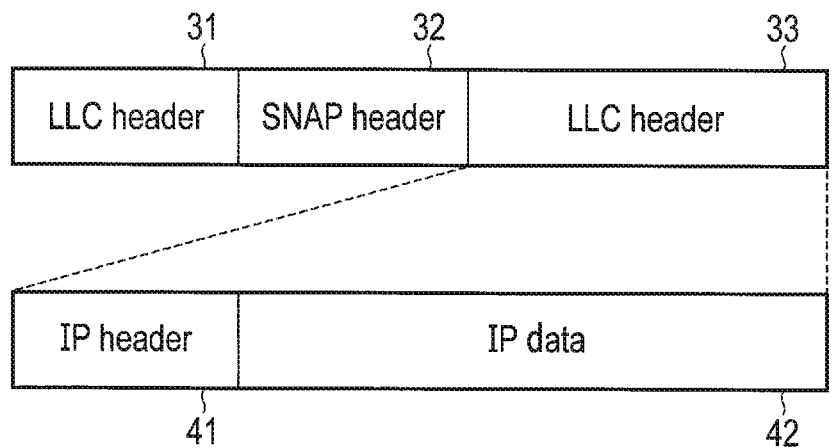
F I G. 8

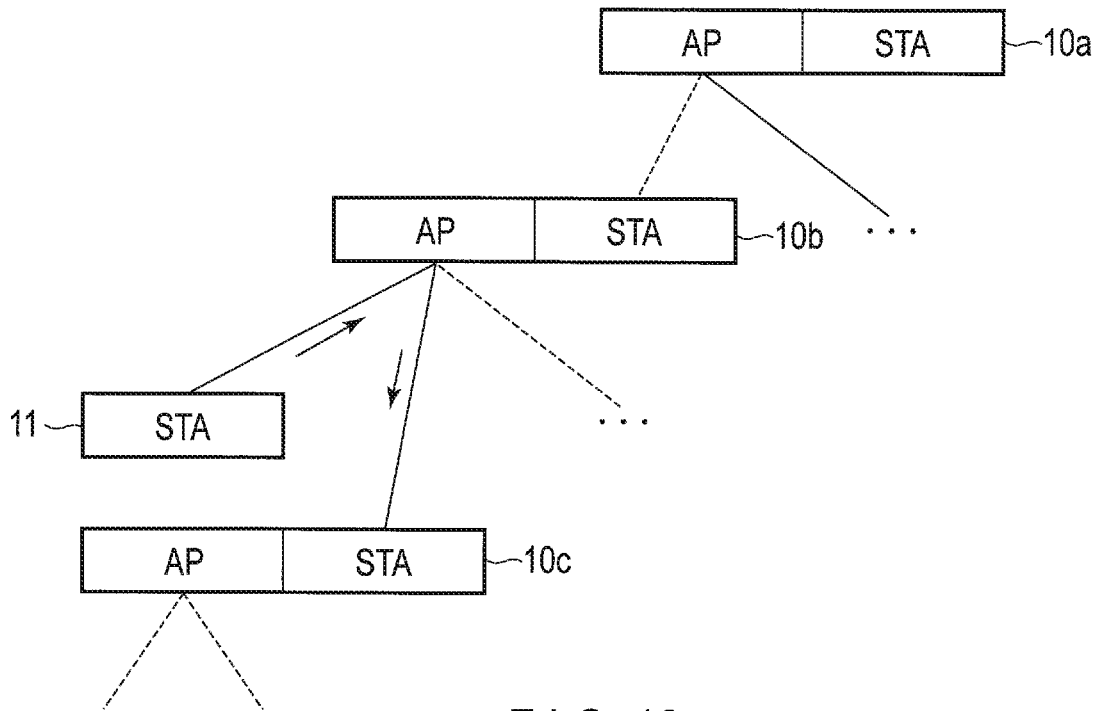
F I G. 12
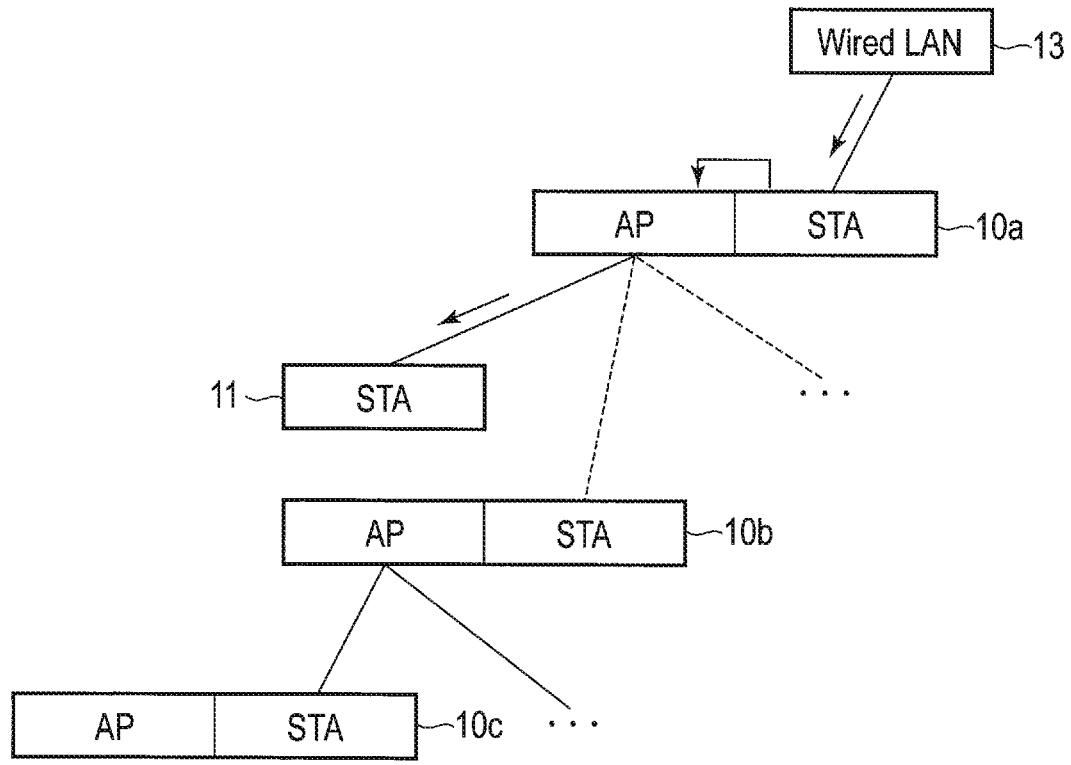
F I G. 13

WIRELESS RELAY APPARATUS AND WIRELESS RELAY METHOD

CROSS-REFERENCE TO RELATED APPLICATIONS

This application is based upon and claims the benefit of priority from Japanese Patent Application No. 2018-225708, filed Nov. 30, 2018, the entire contents of which are incorporated herein by reference.

FIELD

Embodiments described herein relate generally to a wireless relay apparatus and a wireless relay method.

BACKGROUND

A large number of wireless relay apparatuses constructing a mesh network transfer an IP packet to the final destination by repeating transfers between wireless relay apparatuses. All the IP packets are dealt with as data frames at the MAC layer level. If an IP packet is transmitted to a wireless medium such as a frequency or a channel, whether or not a route to the final destination is established is not considered. Only the connection state at the MAC layer level is considered.

Thus, in conventional wireless relay apparatuses, an IP packet may be transferred although a route to the final destination is not established. Accordingly, the resource of a wireless medium is wasted by a data frame including an IP packet which cannot be transferred to the final destination.

BRIEF DESCRIPTION OF THE DRAWINGS

FIG. 5 is a flowchart showing a processing procedure at the time of routing by a wireless relay apparatus according to the embodiment.

FIG. 6 is shown for explaining a case where a wireless relay apparatus joins an existing mesh network according to the embodiment.

FIG. 7 shows the frame format of a MAC frame.

FIG. 8 shows the frame format of an LLC frame.

FIG. 12 is another figure showing an example of a mesh network constructed of wireless relay apparatuses according to the embodiment.

FIG. 13 is another figure showing an example of a mesh network constructed of wireless relay apparatuses according to the embodiment.

DETAILED DESCRIPTION

Figure 1:
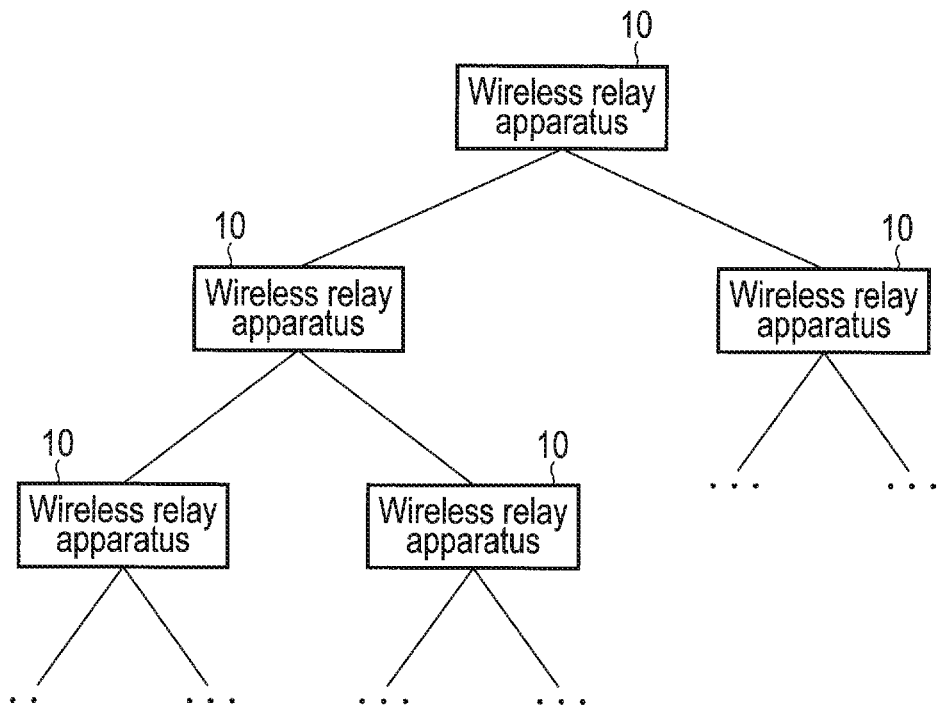
FIG. 1 is a block diagram showing an example of a mesh network system including wireless relay apparatuses according to an embodiment.

Embodiments will be described hereinafter with reference to the accompanying drawings. The disclosure is merely an example and is not limited by contents described in the embodiments below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a wireless relay apparatus includes a first MAC processor, a second MAC processor and a processor. The first MAC processor is connectable to a first wireless apparatus by a first MAC address. The second MAC processor is connectable to a second wireless apparatus by a second MAC address different from the first MAC address. The processor determines whether a route for relaying an IP packet via at least one of the first wireless apparatus and the second wireless apparatus is established. The processor, if a first IP packet having data to be transferred to one of the first wireless apparatus and the second wireless apparatus is received before the route is established, and if a destination of the first IP packet is the first wireless apparatus or the second wireless apparatus, transfers the first IP packet to the first wireless apparatus or the second wireless apparatus. The processor, if the first IP packet is received before the route is established, and if the destination of the first IP packet is not the first wireless apparatus or the second wireless apparatus, and if the first IP packet is further transferred by the first wireless apparatus or the second wireless apparatus, does not transfer the first IP packet to the first wireless apparatus or the second wireless apparatus.

FIG. 1 is a block diagram showing an example of a mesh network system including wireless relay apparatuses according to an embodiment. The mesh network system is constructed of a large number of wireless relay apparatuses 10 as shown in FIG. 1. Each wireless relay apparatus 10 is capable of communicating with and receiving/transmitting data from/to another wireless relay apparatus 10 and interconnected having a parent-child relation.

Figure 2:
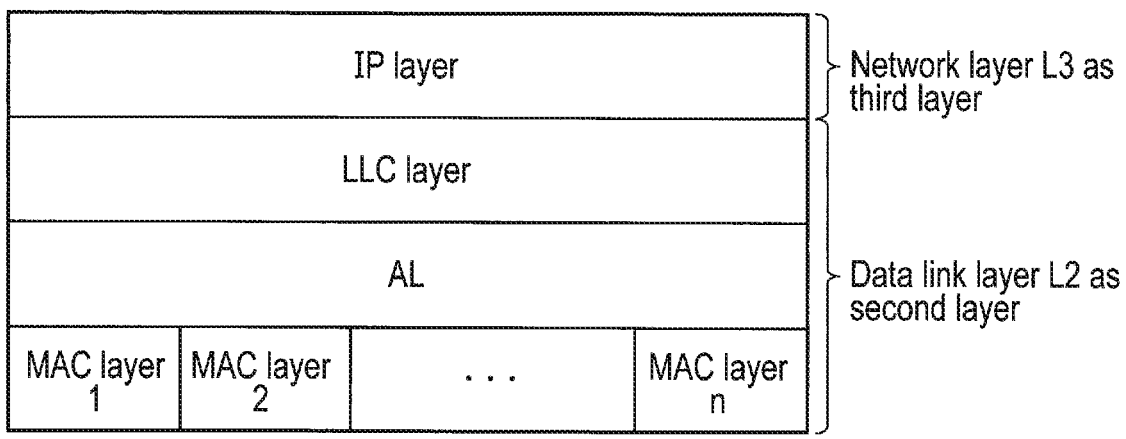
FIG. 2 shows the hierarchical structure of an OSI reference model.

FIG. 2 shows the hierarchical structure of an open systems interconnection (OSI) reference model. FIG. 2 illustrates, of the first to seventh layers given in the OSI reference model, only the data link layer L2 as the second layer and the network layer L3 as the third layer deeply related to the present embodiment.

As shown in FIG. 2, the data link layer L2 as the second layer includes a logical link control (LLC) layer as the upper sublayer, and a plurality of media access control (MAC) layers as the lower sublayer. Between the LLC layer and the MAC layers, the data link layer L2 as the second layer further includes an abstraction layer (AL) to virtually deal with the MAC layers as a single MAC layer. The abstraction layer is defined by the IEEE 1905.1 standard (IEEE Std 1905.1). The network layer L3 as the third layer includes an Internet protocol (IP) layer.

Although omitted in FIG. 2, a plurality of physical (PHY) layers as the first layers are provided under the MAC layers included in the data link layer L2 as the second layer.

Although details are described later, in each wireless relay apparatus 10 of the present embodiment, the process related to the PHY layers and the MAC layers is performed based on the IEEE 802.11 standard (IEEE Std 802.11) and its extended standard (for example, the IEEE 802.11a/b/g/n/ac/ax).

Figure 3:
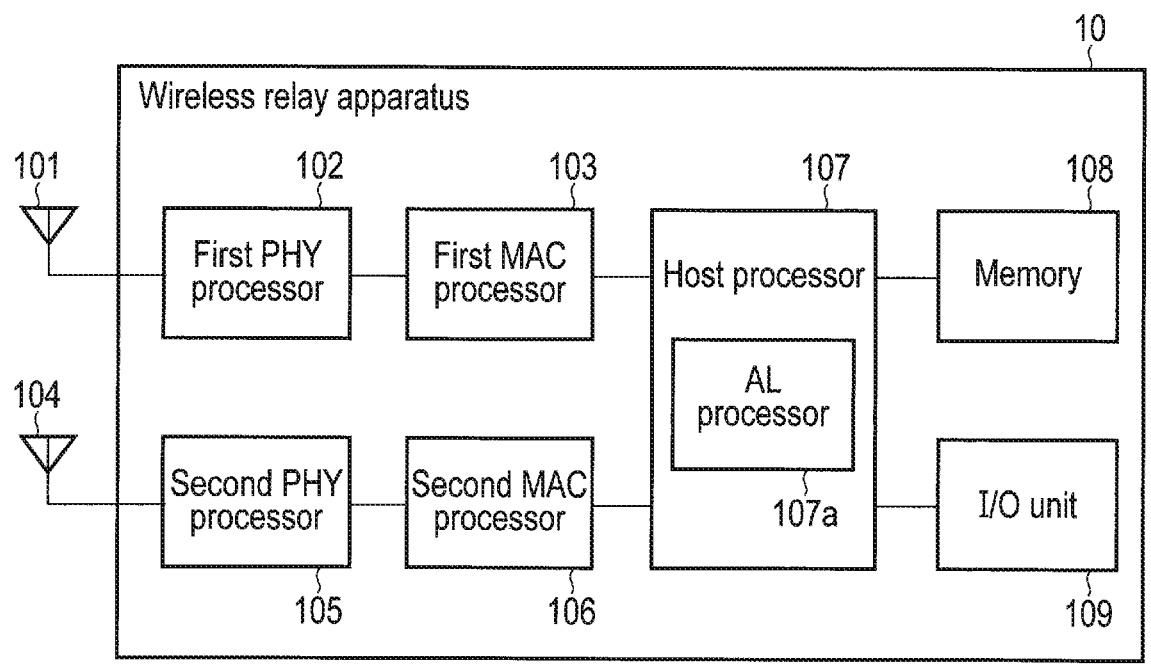
FIG. 3 is a block diagram showing a configuration example of a wireless relay apparatus according to the embodiment.

FIG. 3 is a block diagram showing a configuration example of one of a large number of wireless relay apparatuses 10 shown in FIG. 1. As shown in FIG. 3, the wireless relay apparatus 10 includes a first antenna 101, a first PHY processor 102, a first MAC processor 103, a second antenna 104, a second PHY processor 105, a second MAC processor 106, a host processor 107, a memory 108, an I/O unit 109, etc.

The first antenna transfers wireless signals, for example, using a first frequency.

The first PHY processor 102 performs a process related to a physical layer as the first layer. Specifically, in the case of a receiving process, the first PHY processor 102 receives a wireless signal from the first antenna 101 and demodulates the wireless signal into a baseband signal which can be processed in the first PHY processor 102. The first PHY processor 102 applies a physical packet decoding process, a process for eliminating a PHY preamble and a PHY header, etc., to the baseband signal. The first PHY processor 102 extracts a PHY payload as a MAC frame.

The extracted MAC frame is passed to the first MAC processor 103.

In the case of a transmitting process, if the first PHY processor 102 receives an MAC frame and a transmission instruction from the first MAC processor 103, the first PHY processor 102 performs an encoding process, etc., and converts the MAC frame into a physical packet. The first PHY processor 102 modulates the physical packet into a wireless signal which can be transmitted at the first frequency. The wireless signal obtained by the modulation is passed to the first antenna 101.

The first MAC processor 103 performs a process related to the MAC layers as the lower sublayer included in the data link layer L2 as the second layer. Specifically, in the case of a receiving process, if the first MAC processor 103 receives an MAC frame from the first PHY processor 102, the first MAC processor 103 performs a process for eliminating a MAC header from the MAC frame, etc. The first MAC processor 103 extracts a frame body as a MAC service data unit (MSDU). The MSDU may be referred to as an LLC frame. The extracted LLC frame is passed to the host processor 107.

In the case of a transmitting process, if the first MAC processor 103 receives an LLC frame and a transmission instruction from the host processor 107, the first MAC processor 103 converts the LLC frame into a MAC frame. The MAC frame obtained by the conversion is passed to the first PHY processor 102.

The second antenna 104 transfers wireless signals, for example, using a second frequency. The first frequency used by the first antenna 101 and the second frequency used by the second antenna 104 may be the same or different from each other.

The second PHY processor 105 performs a process related to a physical layer as the first layer. Specifically, in the case of a receiving process, the second PHY processor 105 receives a wireless signal from the second antenna 104 and demodulates the wireless signal into a baseband signal which can be processed in the second PHY processor 105. The second PHY processor 105 applies a physical packet decoding process, a process for eliminating a PHY preamble and a PHY header, etc., to the baseband signal. The second PHY processor 105 extracts a PHY payload as a MAC frame. The extracted MAC frame is passed to the second MAC processor 106.

In the case of a transmitting process, if the second PHY processor 105 receives a MAC frame and a transmission instruction from the second MAC processor 106, the second PHY processor 105 performs an encoding process, etc., and converts the MAC frame into a physical packet. The second PHY processor 105 modulates the physical packet into a wireless signal which can be transmitted at the second frequency. The wireless signal obtained by the modulation is passed to the second antenna 104.

The second MAC processor 106 performs a process related to the MAC layers as the lower sublayer included in the data link layer L2 as the second layer. Specifically, in the case of a receiving process, if the second MAC processor 106 receives a MAC frame from the second PHY processor 105, the second MAC processor 106 performs a process for eliminating a MAC header from the MAC frame, etc. The second MAC processor 106 extracts a frame body as an LLC frame. The extracted LLC frame is passed to the host processor 107.

In the case of a transmitting process, if the second MAC processor 106 receives an LLC frame and a transmission instruction from the host processor 107, the second MAC processor 106 converts the LLC frame into a MAC frame. The MAC frame obtained by the conversion is passed to the second PHY processor 105.

The host processor 107 is connected to the memory 108 and the I/O unit 109 via buses. The host processor 107 realizes a process function unit by executing a program downloaded from an external apparatus by the I/O unit 109 and stored in the memory 108 (in other words, by software). Although details are explained later, the process function unit performs a process related to the layers higher than the MAC layers as the lower sublayer included in the data link layer L2 as the second layer.

To perform the various types of processes described above, the first PHY processor 102 and the second PHY processor 105 may include frequency conversion units, A/D conversion units, demodulation units, D/A conversion units, modulation units, etc., and may be realized by, for example, hardware. The first MAC processor 103 and the second MAC processor 106 may be realized by, for example, a combination of software and hardware. The above process function unit may not be limited to realization by software. For example, the process function unit may be realized by hardware, or a combination of software and hardware. Each group composed of the PHY processor and the MAC processor may be realized by a wireless LAN baseband LSI.

In the example of FIG. 3, an antenna is provided for each of the first PHY processor 102 and the second PHY processor 105. However, the structure is not limited to this example. A single antenna may be provided for the first PHY processor 102 and the second PHY processor 105. In this case, a function which can realize full duplex (FD) is mounted on the first PHY processor 102 and the second PHY processor 105.

The first MAC processor 103 and the second MAC processor 106 shown in FIG. 3 are explained in more detail below.

The first MAC processor 103 and the second MAC processor 106 have respective MAC addresses. The first MAC processor 103 operates as an access point (AP). Alternatively, the first MAC processor 103 includes a function for operating as an AP. The second MAC processor 106 operates as a station (STA), more specifically, operates as a non-AP STA. Alternatively, the second MAC processor 106 includes a function for operating as a non-AP STA.

In the following explanation, a MAC processor connectable to a plurality of wireless relay apparatuses 10 is referred to as an AP. A MAC processor other than the MAC processors called as APs is referred to as a non-AP STA. It should be noted that, if a MAC processor is simply referred to as an STA, the MAC processor includes a MAC processor which operates as an AP as well as a MAC processor which operates as a non-AP STA. In the example of FIG. 3, a single first MAC processor 103 which operates as an AP and a single second MAC processor 106 which operates as a non-AP STA are provided. However, the structure is not limited to this example. A single first MAC processor 103 and a plurality of second MAC processors 106 may be provided. Thus, each wireless relay apparatus 10 includes a single AP and at least one non-AP STA.

The first MAC processor 103 includes, to operate as an AP, a function for transmitting a beacon frame to an STA outside and inside a basic service set (BSS), and a function for performing an authentication process and an association process with respect to a non-AP STA requesting to join a BSS, in an infrastructure mode. The infrastructure mode is a mode structuring a communication group which can share a BSSID based on an AP.

The beacon frame is a frame for regularly notifying an STA of information related to the BSS in which the first MAC processor 103 is an AP. For example, the beacon frame is used to notify an STA of a BSSID for identifying the BSS, the supported standard option functions, a correspondence request related to the transmission rates and modulation encoding schemes, and available channel widths. The BSSID of the BSS in the infrastructure mode is the same as the MAC address of the AP. The information related to the BSS is also included in a probe response (frame transmitted in response) to a probe request frame sent from an STA and is indicated to the STA.

An authentication process and an association process each begins if a corresponding management frame is received from a non-AP STA.

In an authentication process, the first MAC processor 103 receives an authentication frame from a non-AP STA and transmits an authentication frame to the non-AP STA in response to the authentication frame sent from the non-AP STA.

In an association process, the first MAC processor 103 receives an association request frame from a non-AP STA. After determining whether the association request should be accepted or rejected, the first MAC processor 103 transmits an association response frame to the non-AP STA in response to the association request frame to the non-AP STA. The association request frame from the non-AP STA includes, for example, notification indicating the standard option functions supported at the non-AP STA. The association response frame includes notification indicating the standard option functions, etc., supported in the BSS in which the first MAC processor 103 is the AP, and notification indicating whether the association request is accepted or rejected. If the association request from the non-AP STA is accepted, the association response includes an association ID allocated to the non-AP STA in addition to the various types of notification described above.

The second MAC processor 106 includes, to operate as a non-AP STA, a function for receiving a beacon frame transmitted from an AP, and a function for requesting the AP to join a BSS, performing the above authentication process and association process with respect to the AP and exchanging data frames with the AP in which the authentication process and association process succeeded (the AP in which connection is established).

Figure 4:
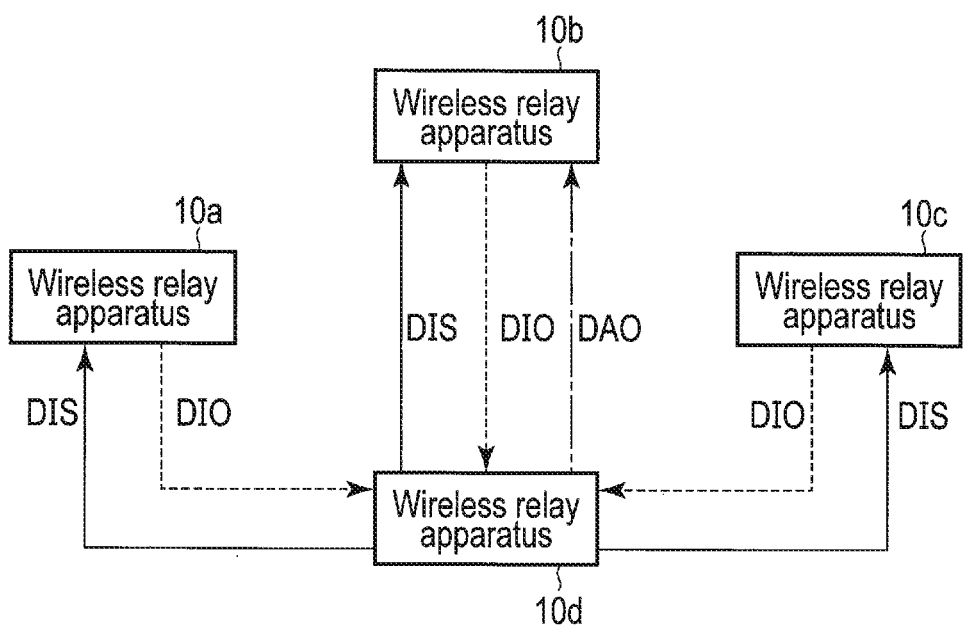
FIG. 4 is shown for explaining routing by a wireless relay apparatus according to the embodiment.

Now, this specification explains routing if an IPv6 routing protocol for low-power and lossy networks (LLNs) (RPL) is adopted as the routing protocol, with reference to FIG. 4 and FIG. 5. In the following explanation, each wireless relay apparatus 10 having the configuration shown in FIG. 3 may be referred to as a relay node 10.

If a wireless relay apparatus 10d newly joins an existing network, as shown in FIG. 4, the wireless relay apparatus (hereinafter, referred to as the new relay node) 10d is connected to one of existing wireless relay apparatuses (hereinafter, referred to as the existing relay nodes) 10a to 10c. Between the new relay node and the existing relay node, the series of processes shown in FIG. 5 are performed.

The new relay node transmits, to the existing relay nodes around the new relay node, an IP packet including a destination-oriented directed acyclic graph (DODAG) information solicitation (DIS) message for requesting a transmission of a DODAG information object (DIO) message (step S1).

In RPL, an IP packet including a DIS message may be either transmitted to a plurality of existing relay nodes in block or transmitted to each existing relay node in unicast manner in series.

For example, if the new relay node is connected to the existing relay nodes as a non-AP STA, an IP packet including a DIS message is transmitted to each existing relay node in unicast manner in series. If the new relay node is connected to the existing relay nodes as an AP, an IP packet including a DIS message is transmitted to a plurality of existing relay nodes in block. In the case of an ad-hoc mode (independent mode) in which all the nodes structuring the network are non-AP STAs, an IP packet including a DIS message is transmitted to a plurality of existing relay nodes in block.

The method for transmitting an IP packet to a plurality of existing relay nodes in block includes a broadcast transmission which does not specify the destination in detail and a multicast transmission which specifies a destination group. As described above, if RPL is adopted as the routing protocol, IPv6 used in RPL does not define broadcast. Thus, an IP packet is transmitted to a plurality of existing relay nodes in block by a multicast transmission.

If a protocol other than RPL is adopted as the routing protocol, an IP packet may be transmitted to a plurality of existing relay nodes in block by a broadcast transmission. As the method for transmitting an IP packet to a plurality of existing relay nodes in block, multi-user (MU) transmission in IEEE 802.11ax may be used.

If an existing relay node receives the IP packet including the DIS message after step S1, the existing relay node transmits an IP packet including a DIO message to the transmission source of the IP packet (new relay node) (step S2).

The DIO message includes a metric and routing information. Although details are described later, the metric indicates the relative distance from a relay node which is defined to be the base point of a large number of relay nodes constructing the network. The relay node which is the base point of the network may be referred to as a root.

In a manner similar to that of an IP packet including a DIS message, an IP packet including a DIO message may be either transmitted in block or transmitted in unicast manner in series. For example, if the new relay node is connected to the existing relay nodes as a non-AP STA, an IP packet including a DIO message is transmitted in a unicast manner in series. In this case, a unicast transmission is applied at the IP layer level, and further, a unicast transmission is applied at the MAC layer level. If the new relay node is connected to the existing relay nodes as an AP, an IP packet including a DIO message is transmitted in block, using the uplink MU transmission in IEEE 802.11ax, etc.

If the new relay node receives IP packets including the DIO messages after step S2, the new relay node selects the existing relay node to which the new relay node should be connected with reference to the DIO messages included in the packets. In other words, the new relay node selects the existing relay node which should be a parent (step S3).

Afterward, the new relay node transmits an IP packet including a destination advertisement object (DAO) to the existing relay node which should be a parent, and notifies the existing relay node that it has been selected as a parent (step S4).

As the series of processes shown in FIG. 5 is performed, the new relay node selects the existing relay node to which the new relay node should be connected (in other words, selects a route), and joins the existing network. Between relay nodes in which the series of processes shown in FIG. 5 has been performed, and the exchange of DIO messages for DIS messages and DAO messages for DIS messages has been completed, a route for relaying an IP packet is established.

Now, this specification explains a specific example if a new relay node joins an existing mesh network with reference to FIG. 6. In the example of FIG. 6, the new relay node 10d joins an dendritic mesh network constructed of the existing relay nodes 10a to 10c.

The existing relay node 10a is a relay node equivalent to a root. The existing relay node 10a is connected to two existing relay nodes 10b and 10c functioning as children. In the following explanation, the relay node side on which the root is present is referred to as upstream, and the other side is referred to as downstream.

FIG. 6 assumes that the new relay node 10d is connected to the downstream of the existing relay nodes 10b and 10c. In the following explanation, if the existing relay node 10a is referred to as a parent node, the existing relay nodes 10b and 10c may be referred to as child nodes, and further, the new relay node 10d may be referred to as a grandchild node. If the existing relay nodes 10b and 10c are referred to as parent nodes, the new relay node 10d may be referred to as a child node.

In FIG. 6, each parent node and its child node are connected in the relationship between an AP and a non-AP STA at the MAC layer level. For example, the AP (the first MAC processor 103) of the existing relay node 10a acting as a parent node connects with the non-AP STAs (the second MAC processors 106) of the existing relay nodes 10b and 10c acting as child nodes. To transmit an IP packet including a DIS message to the existing relay nodes 10b and 10c which can be parents, the new relay node 10d is connected to the AP of the existing relay node 10b by one of the non-AP STAs of the new relay node 10d (that is, STA 1) and is connected to the AP of the existing relay node 10c by the other non-AP STA (that is, STA 2) at the MAC layer level. In FIG. 6, for convenience sake, a non-AP STA is simply described as an STA.

In this case, the new relay node 10d transmits an IP packet including a DIS message to each of the existing relay nodes 10b and 10c.

If the existing relay nodes 10b and 10c receive the IP packet including the DIS message, each of the existing relay nodes 10b and 10c transmits an IP packet including a DIO message to the new relay node 10d.

As described above, the DIO message includes a metric indicating the relative distance from the relay node which is the root. If RPL is adopted as the routing protocol, the metric is indicated by the relative number of hops from the relay node which is the root. The number of hops is referred to as a rank. For example, the rank of the existing nodes 10b and 10c shown in FIG. 6 is one. The rank of the new relay node 10d connected to the downstream of the existing relay nodes 10b and 10c is two.

If the new relay node 10d receives the IP packets including the DIO messages from the existing relay nodes 10b and 10c, the new relay node 10d selects an existing relay node which should be a parent with reference to the DIO message included in each packet. For example, an existing relay node in which the rank included in a DIO message is less is selected as a parent. The rank of both of the existing relay nodes 10b and 10c is one. Here, it is assumed that the existing relay node 10b is selected as a parent.

The new relay node 10d notifies the existing relay node 10b that it has been selected as a parent by transmitting an IP packet including a DAO message to the existing relay node 10b selected as a parent. By this procedure, the route from the relay node 10a to the relay node 10d via the relay node 10b is established.

The AP (the first MAC processor 103) and the non-AP STA (the second MAC processor 106) of each of the relay nodes 10a to 10d shown in FIG. 6 may stop their functions depending on the situation.

For example, the non-AP STA of the relay node 10a is not used as long as the relay node 10a continues to function as the root. Therefore, in this case, the non-AP STA of the relay node 10a may stop its function.

If the relay node 10d shown in FIG. 6 selects the relay node 10b as a parent as described above, the connection between STA 2 which is one of the non-AP STAs of the relay node 10d and the AP of the relay node 10c at the MAC layer level is unnecessary. Therefore, STA 2 of the relay node 10d may stop its function.

However, in consideration of a possibility that the route is re-examined, the connection to the relay nodes 10 located around its own node at the MAC layer level should be preferably maintained to transmit an IP packet including a DIS message. In this way, if the route is re-examined, the process for performing connection at the MAC layer level again can be omitted. In consideration of a possibility that the route is re-examined without changing the rank of its own node, the relay nodes 10 should preferably hold the same number of non-AP STAs (second MAC processors 106) as the rank.

Although omitted in FIG. 6, a wired network may be connected to the relay nodes 10 (for example, the relay node 10a which is the root).

In the example of FIG. 6, an dendritic mesh network is shown as the mesh network constructed of a large number of relay nodes 10. However, the structure of the mesh network is not limited to this example. For example, in the mesh network, the relay nodes 10 may have an N-to-N connection to each other. In this case, each of the relay nodes 10 constructing the mesh network selects a plurality of relay nodes 10 as parents. In this configuration, if an IP packet in which the final destination is a relay node 10 is transferred, a plurality of types of routes can be provided as the routes to the final destination. For example, if one route is unavailable, another route can be used to transfer the IP packet.

Now, this specification explains the details of the process function unit which is realized if the host processor 107 executes the program stored in the memory 108. In the following explanation, the process function unit is referred to as an AL processor 107a. The AL processor 107a performs a process related to the abstraction layer included in the data link layer L2 as the second layer.

First, frame formats of a MAC frame and an LLC frame related to the AL processor 107a are explained.

FIG. 7 shows the frame format of a MAC frame. The MAC frame may be referred to as a MAC protocol data unit (MPDU). As shown in FIG. 7, the MAC frame includes a MAC header 21, a frame body 22 and a frame check sequence (FCS) 23.

The MAC header 21 includes a plurality of fields. Information necessary for a receiving process at the MAC layer level is set in each field. More specifically, information indicating the frame type described later, information for setting a transmission prohibition period (network allocation vector [NAV]), address information of the destination and transmission source and the like are set in the fields included in the MAC header 21.

The type of the MAC frame is roughly categorized into the following three types: a data frame; a management frame; and a control frame. Information indicating the type of the MAC frame is set in the type field of a plurality of fields included in the MAC header 21. Information indicating the defined type of the frame within the frame type set in the type field is set in the subtype field of a plurality of fields included in the MAC header 21.

Address information is set in the address field of a plurality of fields included in the MAC header 21. The number of address fields included in the MAC header 21 differs depending on the frame type, or whether the destination is in the same BSS or outside the same BSS. Address information indicating a BSSID (the MAC address of the AP constructing the BSS), a MAC address, a broadcast address, a multicast address and the like is set in the address fields. Address information indicating the direct transmission destination address (receiver address [RA]) of the MAC frame is always set in one of the address fields. If a plurality of address fields are provided, this address information is always set in the first address field.

If the type of the MAC frame is a data frame, an MSDU (LLC frame) is set in the frame body 22. An error detection code (cyclic redundancy code [CRC]) calculated to determine whether or not the MAC header 21 and the frame body 22 are normally received is set in the FCS 23.

FIG. 8 shows the frame format of an LLC frame. As shown in FIG. 8, the LLC frame includes an LLC header 31, a subnetwork access protocol (SNAP) header 32 and LLC data 33.

A destination service access point (DSAP) indicating the destination at the LLC layer level and a source service access point (SSAP) indicating the transmission source at the LLC layer level are set in the LLC header 31. As shown in FIG. 8, an IP packet including an IP header 41 indicating an address at the IP layer level and IP data 42 is set in the LLC data 33.

Figure 9:
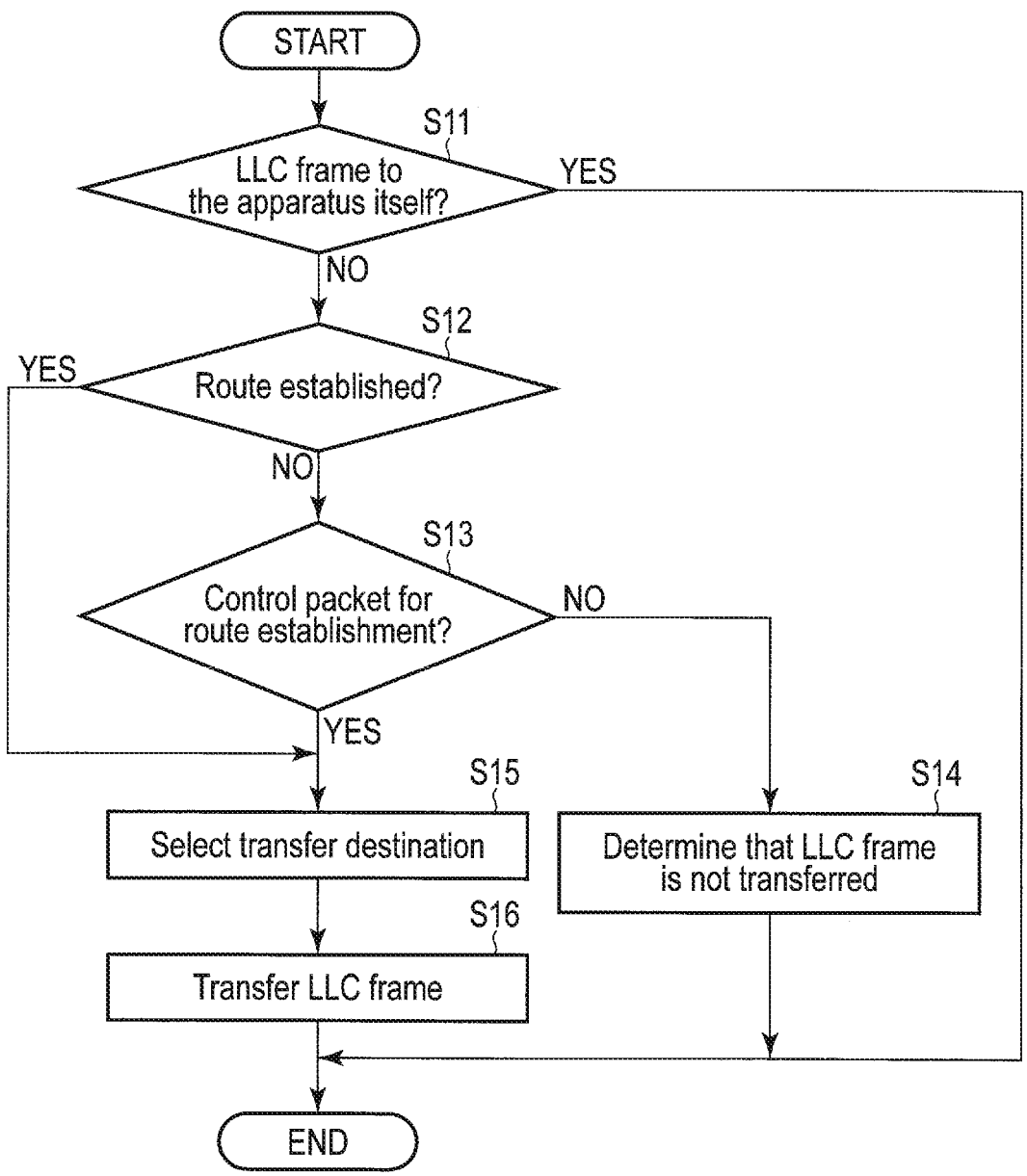
FIG. 9 is a flowchart showing a processing procedure at the time of transfer by a wireless relay apparatus according to the embodiment.

Now, this specification explains the details of the process performed by the AL processor 107a. FIG. 9 is a flowchart showing an example of the procedure of the process performed by the AL processor 107a. The transfer of an LLC frame is used synonymously with the transfer of the IP packet included as the LLC data 33 in the LLC frame. An IP packet refers to a transmission control protocol (TCP)/IP packet or a user datagram protocol (UDP)/IP packet.

If the AL processor 107a receives an LLC frame from the first MAC processor 103 or the second MAC processor 106, the AL processor 107a determines whether or not the destination of the LLC frame is set to the apparatus itself with reference to the DSAP in the LLC header 31 included in the LLC frame (step S11).

If it is determined that the destination of the LLC frame is the apparatus itself as a result of step S11 (YES in step S11), the AL processor 107a passes the LLC frame to the LLC processor (not shown) which can perform a process related to the LLC layer, and terminates the series of processes.

If it is determined that the destination of the LLC frame is not the apparatus itself as a result of step S11 (NO in step S11), the AL processor 107a determines whether or not a route to the destination of the LLC frame is established based on the DSAP in the LLC header 31 included in the LLC frame and the route information stored in advance (step S12).

The route information is information indicating an established route, and is stored in, for example, the memory 108 in advance. When this specification states that a route is established, this statement indicates a state having route information such as which wireless relay apparatuses 10 should be used to transfer an LLC frame to the wireless relay apparatus 10 which is the destination of the LLC frame (in other words, to the destination wireless relay apparatus), and further, which MAC processors of the wireless relay apparatuses 10 should be used. In the present embodiment, a route is established between wireless relay apparatuses in which the exchange of DIO messages for DIS messages and DAO messages for DIS messages has been completed.

When this specification states that a route is not established, this statement indicates a state which does not have the above route information. In other words, the statement indicates a state in which no destination wireless relay apparatus cannot be determined, or the wireless relay apparatus 10 for the transfer to a destination wireless relay apparatus cannot be determined. Further, if one of the wireless relay apparatuses 10 on the route becomes absent, it can be said that the route is lost. If a route is not determined at the time of receiving an LLC frame although the route was established in the past, the state returns to an unestablished state. If a wireless relay apparatus 10 transmits an IP packet including a DIS message to re-examine the route, the route which was established via the wireless relay apparatus 10 returns to an unestablished state.

If the connection is cut at the MAC layer level of a wireless relay apparatus 10, the route established via the wireless relay apparatus 10 returns to an unestablished state. If the connection is cut at the MAC layer level, the wireless relay apparatuses 10 cannot transfer any IP packet as a matter of course. As a situation in which the connection is cut at the MAC layer level, the following examples are considered. For example, a wireless relay apparatus 10 transmits a data frame to another wireless relay apparatus 10. Since the acknowledgement of the receipt of the data frame cannot be obtained, the data frame is repeatedly transmitted. However, the number of retransmissions reaches the reference value. Thus, a retry out occurs. As another example, the lifetime of data is continuously expired, and a wireless relay apparatus 10 determines that another wireless relay apparatus 10 is not present. Further, as another example, the following situation is considered. A wireless relay apparatus 10 transmits a disassociation frame or a deauthentication frame to another wireless relay apparatus 10. The wireless relay apparatus 10 which receives the disassociation frame or the deauthentication frame cannot transmit a data frame to the wireless relay apparatus 10 which is the transmission source of the disassociation frame or the deauthentication frame.

If it is determined that a route to the destination of the LLC frame is established as a result of step S12 (YES in step S12), the AL processor 107a performs the process of step S15 described later.

If it is determined that a route to the destination of the LLC frame is not established as a result of step S12 (NO in step S12), the AL processor 107a determines whether or not the IP packet included in the LLC frame as the LLC data 33 is a control packet for route establishment (step S13).

A control packet for route establishment includes a general message for selecting a route. If RPL is adopted as the routing protocol, a message for selecting a route includes a message for implementing a protocol for allocating an IP address (for example, a dynamic host configuration [DHC] protocol).

Specifically, of IP packets, a control packet for route establishment is used for an Internet control message protocol for IPv6 (ICMPv6). In ICMPv6, the value of the protocol subfield of the IP header is 58. Thus, if RPL is adopted as the routing protocol, the AL processor 107a may refer to the IP header 41 of the IP packet included as the LLC data 33. If the value of the protocol subfield of the IP header 41 is 58, the AL processor 107a may determine that the IP packet is a control packet for route establishment. In the other cases, the AL processor 107a may determine that the IP packet is a data packet.

The present embodiment assumes that RPL is adopted as the routing protocol. However, the structure is not limited to this example. For example, an open shortest path first (OSPF) may be adopted as the routing protocol. In this case, the value of the protocol subfield of the IP header is 89. Thus, if OSPF is adopted as the routing protocol, the AL processor 107a may refer to the IP header 41 of the IP packet included as the LLC data 33. If the value of the protocol subfield of the IP header 41 is 89, the AL processor 107a may determine that the IP packet is a control packet for route establishment. In the other cases, the AL processor 107a may determine that the IP packet is a data packet.

Whether or not the IP packet is a control packet for route establishment may be determined by implementing the OR operation of a plurality of protocol subfields. This method is effective if a plurality of routing protocols are used in combination.

The determination as to whether or not the IP packet is a control packet for route establishment is not limited to the determination by the value of the protocol subfield of the IP header. For example, an address resolution protocol (ARP) frame may be used for route establishment. An ARP frame is transmitted as TCP/IP as an IP packet. Thus, whether or not the frame is an ARP frame cannot be determined by the protocol subfield of the IP header. In this case, the AL processor 107a may refer to the frame type in the Ethernet (registered trademark) header included in an Ethernet frame and determine that the IP packet included in the Ethernet frame as data is a control packet for route establishment if the frame type is 0x0806 indicating ARP. This determination method is mainly used if data is transmitted from a wired LAN to a wireless relay apparatus 10. If data is transmitted from a wireless LAN, the AL processor 107a may refer to the payload of a UDP frame and determine whether or not the data is a control packet for route establishment.

If it is determined that the IP packet is not a control packet for route establishment as a result of step S13 (NO in step S13), the AL processor 107a determines that the LLC frame is not transferred (step S14), and terminates a series of processes.

If it is determined that the IP packet is a control packet for route establishment as a result of step S13 (YES in step S13), the AL processor 107a selects the transfer destination of the LLC frame based on the DSAP in the LLC header 31 included in the LLC frame and the route information stored in advance (step S15).

It is enough if the transfer destination of the LLC frame basically has a MAC address different from the MAC processor which passed the LLC frame in step S11.

Afterward, the AL processor 107a transfers the LLC frame to the selected transfer destination. At this time, the AL processor 107a also notifies the selected transfer destination of the next transfer destination of the LLC frame (step S16), and terminates a series of processes.

If the MAC processor of the transfer destination receives the LLC frame transferred by the AL processor 107a, the MAC processor converts the LLC frame into a MAC frame. At this time, the MAC address of the next transfer destination received together with the LLC frame is set to the transmission destination address (RA) of the MAC frame. After a PHY processor corresponding to the MAC processor of the transfer destination converts the MAC frame into a physical packet, the PHY processor modulates the physical packet into a wireless signal having a transmittable frequency for a corresponding antenna. The corresponding antenna transmits the wireless signal.

For example, the LLC frame transferred in step S16 may be temporarily stored in the memory 108. Alternatively, the LLC frame transferred in step S16 may be temporarily stored in a work memory which can be accessed by the MAC processor of the transfer destination, etc.

The LLC frame which is not transferred as a result of determination of step S14 may be discarded (deleted). Alternatively, the LLC frame which is not transferred as a result of determination of step S14 may be temporarily stored in the memory 108, a work memory which can be accessed by the MAC processor, etc. More specifically, the LLC frame may be temporarily stored in a work memory which can be accessed by all the MAC processors included in the wireless relay apparatus 10 which determines that the LLC frame is not transferred or a part of the MAC processors which can be candidates for the transfer destination, etc.

After a route to the destination of the LLC frame stored in the memory 108 is established, the LLC frame may be obtained by the AL processor 107a, and the transfer to the destination may begin. After a route to the destination of the LLC frame stored in a work memory which can be accessed by the MAC processor is established, the LLC frame may be obtained by the MAC processor, and the transfer to the destination of the LLC frame may begin. In this way, the retransmissions at the application level can be reduced. The processing delay can be decreased.

If a route to the destination of the LLC frame is not established, the use of a wireless medium such as a frequency or a channel can be limited to only a control packet for route establishment by performing the series of processes shown in FIG. 9 explained above by the AL processor 107a.

In this configuration, even if a route to the destination of an LLC frame is not established, and if the IP packet included in the LLC frame as the LLC data 33 is not a control packet for route establishment, it is possible to eliminate the conventional inconvenience in which the LLC frame is transferred and the wireless medium is wasted. By eliminating this inconvenience, the wireless medium is effectively used. A route can be more rapidly generated (established) in comparison with the conventional technology.

In the conventional technology, even if a route to the destination of an LLC frame is not established, and if the IP packet included in the LLC frame as the LLC data 33 is not a control packet for route establishment, the LLC frame is transferred. Thus, for example, a process for converting the LLC frame into a MAC frame is needed. However, since this process is not needed, the total number of processes is decreased. Thus, the energy consumption can be reduced.

If a route to the destination of an LLC frame is established, the AL processor 107a does not perform a process for determining whether or not the IP packet included in the LLC frame as the LLC data 33 is a control packet for route establishment. In this configuration, the number of processes performed if a route to the destination of an LLC frame is established can be minimized. Thus, the energy consumption can be reduced.

Assuming the specific situations, a series of processes performed by the AL processor 107a is explained.

Figure 10:
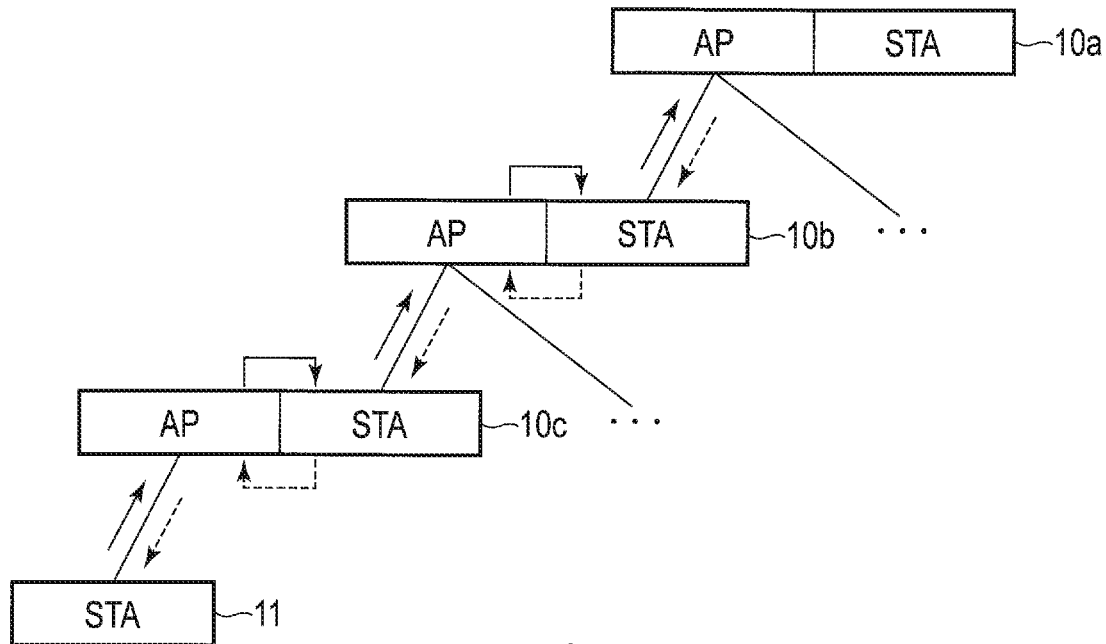
FIG. 10 is a figure showing an example of a mesh network constructed of wireless relay apparatuses according to the embodiment.

FIG. 10 exemplarily shows a case where a non-relay node 11 is connected to the mesh network constructed of the relay nodes 10a to 10c. The non-relay node 11 is a node which does not have a function operating as an AP and has a function operating as a single non-AP STA. In FIG. 10, the relay node 10a corresponds to a root. The relay nodes 10b and 10c are located downstream of the relay node 10a in order. The non-relay node 11 is connected to the relay node 10c located at the lowest position of the downstream. In FIG. 10, each parent node and its child node are connected to each other in the relationship between an AP and a non-AP STA at the MAC layer level. Further, FIG. 10 assumes a case where a route from the relay node 10a to the non-relay node 11 is established. For convenience sake, in FIG. 10, each non-AP STA is simply described as an STA.

Now, this specification explains now relay is performed when an IP packet (LLC frame) in which the final destination is the relay node 10a is generated at the non-relay node 11. In other words, the relay of an IP packet from the downstream side to the upstream side is explained.

The IP packet generated at the non-relay node 11 is transmitted from the non-relay node 11 to the relay node 10c.

If the IP packet from the non-relay node 11 is received by the first MAC processor 103 operating as an AP at the MAC layer level, the relay node 10c performs the series of processes shown in FIG. 9 as described above. FIG. 10 assumes a case where a route from the relay node 10a to the non-relay node 11 is established. Thus, the relay node 10c selects the non-AP STA (the second MAC processor 106) of the own node as the transfer destination. The received IP packet is transferred to the non-AP STA of the relay node 10c. When the IP packet is transferred, the non-AP STA of the relay node 10c is notified that the next transfer destination is the relay node 10b (specifically, the AP of the relay node 10b). The non-AP STA of the relay node 10c further transfers the received IP packet to the relay node 10b.

If the relay node 10b receives the IP packet from the relay node 10c, the relay node 10b operates in a manner similar to that of the relay node 10c. The relay node 10b transfers the IP packet generated at the non-relay node 11 to the relay node 10a which is the final destination. In this way, the IP packet generated at the non-relay node 11 reaches the relay node 10a which is the final destination through the route shown with the solid arrows in FIG. 10.

Here, as it is assumed that a route from the relay node 10a to the non-relay node 11 is established, the received IP packet is transferred as described above. In a case where a route from the relay node 10a to the non-relay node 11 is not established, the received IP packet is transferred if it is a control packet for route establishment. However, if the received IP packet is not a control packet for route establishment, the IP packet is not transferred.

In the above description, relay of an IP packet from the downstream side to the upstream side was explained. This explanation can be also applied to relay of an IP packet in which the final destination is the non-relay node 11, in other words, the relay of an IP packet from the upstream side to the downstream side. In this case, the IP packet is transferred from the relay node 10a to the non-relay node 11 through the route opposite to the above description as shown with the dashed arrows in FIG. 10.

In the present embodiment, in a case where a route to the destination indicated by the DSAP in the LLC header 31 included in an LLC frame is not established, the AL processor 107a basically permits transfer if the IP packet included in the LLC frame as the LLC data 33 is a control packet for route establishment. The AL processor 107a does not permit transfer if the IP packet is not a control packet for route establishment. However, in the following situation, even if a route to the destination of an LLC frame is not established, and if the IP packet included in the LLC frame as the LLC data 33 is not a control packet for route establishment, the AL processor 107a should preferably permit the transfer of the LLC frame.

Figure 11:
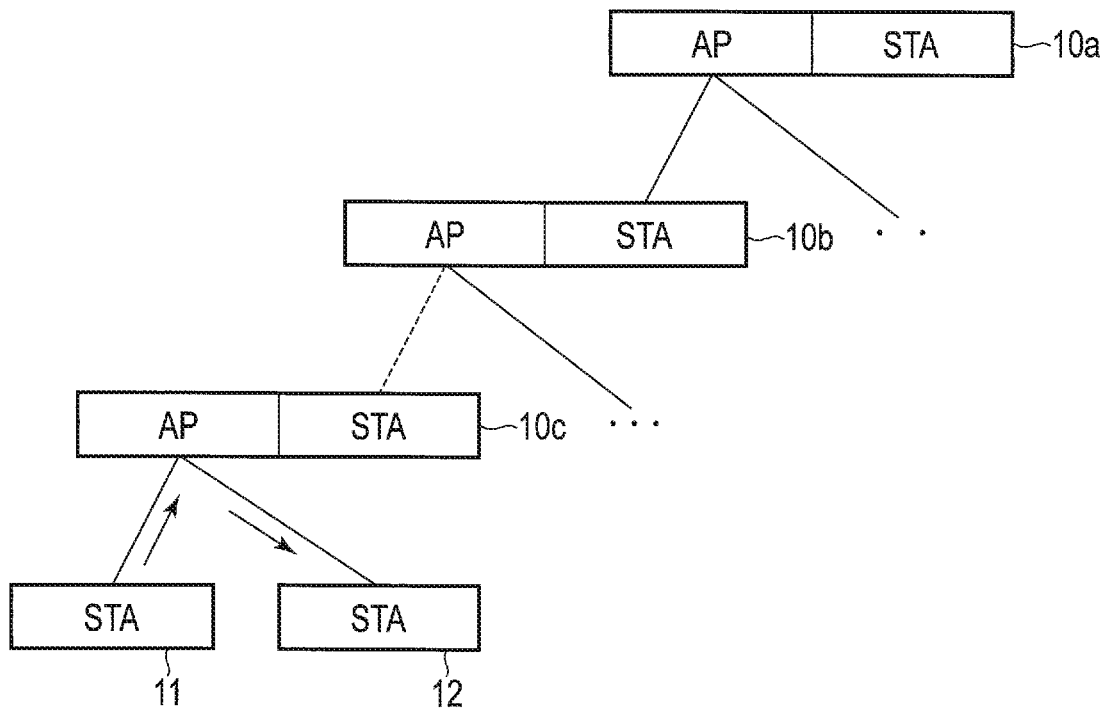
FIG. 11 is another figure showing an example of a mesh network constructed of wireless relay apparatuses according to the embodiment.

FIG. 11 exemplarily shows a case where a non-relay node 12 is further connected to the relay node 10c shown in FIG. 10. In FIG. 11, each parent node and its child node are connected to each other in the relationship between an AP and a non-AP STA at the MAC layer level. FIG. 11 assumes a case where a route is not established between some of the relay nodes. More specifically, in FIG. 11, connections indicated with solid lines show that exchanges of DIO messages for DIS messages and DAO messages for DIS messages have been completed. A connection indicated with a dashed line shows that exchanges of DIO messages for DIS messages and DAO messages for DIS messages have not been completed.

For convenience sake, in FIG. 11, each non-AP STA is simply described as an STA. In the following description, relay when an IP packet (data packet) which is not a control packet for route establishment is generated at the non-relay node 11, and when the final destination of the IP packet is the non-relay node 12 is explained.

The IP packet generated at the non-relay node 11 is transmitted from the non-relay node 11 to the relay node 10c.

When the IP packet from the non-relay node 11 is received by the first MAC processor 103 operating as an AP at the MAC layer level, the relay node 10c performs the series of processes shown in FIG. 9 as described above. As FIG. 11 assumes a case where a route is not established between the relay nodes, normally, the IP packet which is generated at the non-relay node 11 and is not a control packet for route establishment is not transferred.

However, the relay node 10c is connected to the non-relay node 12 which is the destination of the IP packet generated at the non-relay node 11 in the relationship between an AP and a non-AP STA at the MAC layer level. Therefore, the AL processor 107a determines that the IP packet should be preferably transferred to the non-relay node 12 even if a route is not established between the relay nodes and if the IP packet is not a control packet for route establishment. Based on this determination, the AL processor 107a retransfers the received IP packet to the first MAC processor 103 operating as an AP at the MAC layer level and connected to the non-relay node 12.

The retransferred IP packet is converted into a MAC frame by the first MAC processor 103, and is finally transferred to the non-relay node 12. Even if a route is not established between the relay nodes, and if the IP packet to be transferred is not a control packet for route establishment, the relay node 10c is capable of transferring the IP packet generated at the non-relay node 11 to the non-relay node 12 which is the final destination.

The arrows in FIG. 11 show how the IP packet generated at the non-relay node 11 is transferred to the non-relay node 12 via the relay node 10c. In this case, as shown with the arrows in FIG. 11, in the relay node 10c, the second MAC processor 106 operating as a non-AP STA at the MAC layer level does not operate, and only the first MAC processor 103 operating as an AP at the MAC layer level operates.

FIG. 12 exemplarily shows a case where the non-relay node 11 is connected to the relay node 10b of the mesh network constructed of the relay nodes 10a to 10c. In FIG. 12, each parent node and its child node are connected to each other in the relationship between an AP and a non-AP STA at the MAC layer level. FIG. 12 assumes a case where a route is not established between some of the relay nodes. More specifically, in FIG. 12, connections indicated with solid lines show that exchanges of DIO messages for DIS messages and DAO messages for DIS messages have been completed. Connections indicated with dashed lines show that exchanges of DIO messages for DIS messages and DAO messages for DIS messages have not been completed.

For convenience sake, in FIG. 12, each non-AP STA is simply described as an STA. In the following description, relay when an IP packet which is not a control packet for route establishment is generated at the non-relay node 11, and when the final destination of the IP packet is the relay node 10c is explained.

The IP packet generated at the non-relay node 11 is transmitted from the non-relay node 11 to the relay node 10b.

When the IP packet from the non-relay node 11 is received by the first MAC processor 103 operating as an AP at the MAC layer level, the relay node 10b performs the series of processes shown in FIG. 9 as described above. As FIG. 12 assumes a case where a route is not established between the relay nodes, normally, the IP packet which is generated at the non-relay node 11 and is not a control packet for route establishment is not transferred.

However, the relay node 10b is connected to the relay node 10c which is the destination of the IP packet generated at the non-relay node 11 in a relationship between an AP and a non-AP STA at the MAC layer level. Therefore, the AL processor 107a determines that the IP packet should be preferably transferred to the non-relay node 10c even if a route is not established between the relay nodes and if the IP packet is not a control packet for route establishment. Based on this determination, the AL processor 107a retransfers the received IP packet to the first MAC processor 103 operating as an AP at the MAC layer level and connected to the non-relay node 10c.

The retransferred IP packet is converted into a MAC frame by the first MAC processor 103, and is finally transferred to the relay node 10c. Even if a route is not established between the relay nodes, and if the IP packet to be transferred is not a control packet for route establishment, the relay node 10b is capable of transferring the IP packet generated at the non-relay node 11 to the relay node 10c which is the final destination.

The arrows in FIG. 12 show how the IP packet generated at the non-relay node 11 is transferred to the relay node 10c via the relay node 10b. In this case, as shown with the arrows in FIG. 12, in the relay node 10b, the second MAC processor 106 operating as a non-AP STA at the MAC layer level does not operate, and only the first MAC processor 103 operating as an AP at the MAC layer level operates.

FIG. 11 and FIG. 12 exemplarily show cases where the AL processor 107a has a function of retransferring an IP packet. However, the configuration is not limited to these examples. A function corresponding to this retransfer may be provided in the first MAC processor 103. After the first MAC processor 103 extracts an LLC frame equivalent to an MSDU from a MAC frame, the first MAC processor 103 may not simply pass the extracted LLC frame to the host processor 107. Instead, the first MAC processor 103 may be configured to refer to the MAC header included in the MAC frame (specifically, the MAC address of the final destination set in the address 3 subfield (destination address [DA])). If the MAC address of the final destination is another relay node or non-relay node connected to the first MAC processor 103, the first MAC processor 103 may be configured to convert the extracted LLC frame into a MAC frame and transfer the MAC frame to the final destination.

FIG. 13 exemplarily shows a case where the non-relay node 11 is connected to the relay node 10a of the mesh network constructed of the relay nodes 10a to 10c, and the relay node 10a is connected to a wired LAN 13. In FIG. 13, each parent node and its child node are connected to each other in the relationship between an AP and a non-AP STA at the MAC layer level. FIG. 13 assumes a case where a route is not established between some of the relay nodes. More specifically, in FIG. 13, connections indicated with solid lines show that exchanges of DIO messages for DIS messages and DAO messages for DIS messages have been completed. Connections indicated with dashed lines show that the exchanges of DIO messages for DIS messages and DAO messages for DIS messages have not been completed.

For convenience sake, in FIG. 13, each non-AP STA is simply described as an STA. In the following description, relay when an IP packet which is not a control packet for route establishment is transmitted from the wired LAN 13, and when the final destination is the non-relay node 11 is explained. However, this explanation can be also applied to, for example, relay when an IP packet which is not a control packet for route establishment is generated at the relay node 10a, and when the final destination is the non-relay node 11.

If the IP packet from the wired LAN 13 is received by the second MAC processor 106 operating as a non-AP STA at the MAC layer level, the relay node 10a performs the series of processes shown in FIG. 9 as described above. As FIG. 13 assumes a case where a route is not established between the relay nodes, normally, the IP packet which is transmitted from the wired LAN 13 and is not a control packet for route establishment is not transferred.

However, the relay node 10a is connected to the non-relay node 11 which is the destination of the IP packet transmitted from the wired LAN 13 in the relationship between an AP and a non-AP STA at the MAC layer level. Therefore, the AL processor 107a determines that the IP packet should be preferably transferred to the non-relay node 11 even if a route is not established between the relay nodes and if the IP packet is not a control packet for route establishment. Based on this determination, the AL processor 107a transfers the received IP packet to the first MAC processor 103 operating as an AP at the MAC layer level and connected to the non-relay node 11.

The transferred IP packet is converted into a MAC frame by the first MAC processor 103, and is finally transferred to the non-relay node 11. Even if a route is not established between the relay nodes, and if the IP packet to be transferred is not a control packet for route establishment, the relay node 10a is capable of transferring the IP packet transmitted from the wired LAN 13 to the non-relay node 11 which is the final destination.

The arrows in FIG. 13 show how the IP packet transmitted from the wired LAN 13 is transferred to the non-relay node 11 via the relay node 10a. In this case, as shown with the arrows in FIG. 13, in the relay node 10a, the IP packet is transferred from the second MAC processor 106 operating as a non-AP STA at the MAC layer level to the first MAC processor 103 operating as an AP at the MAC layer level, and subsequently, further transferred to the non-relay node 11.

Figure 14:
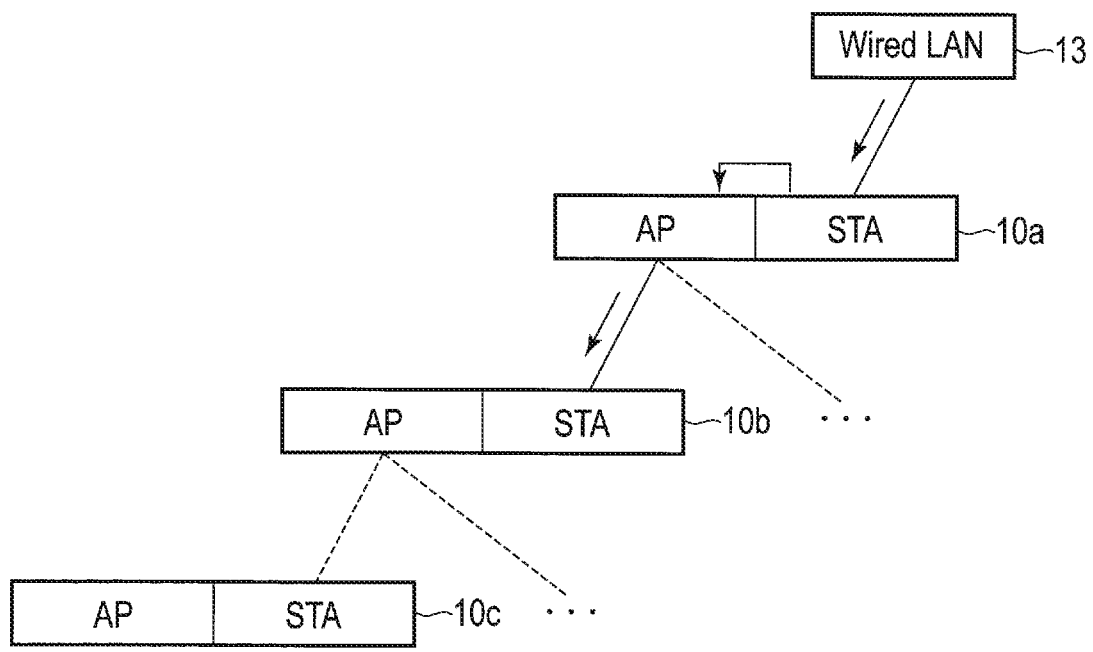
FIG. 14 is another figure showing an example of a mesh network constructed of wireless relay apparatuses according to the embodiment.

FIG. 14 exemplarily shows a case where the relay node 10a of the mesh network constructed of the relay nodes 10a to 10c is connected to the wired LAN 13. In FIG. 14, each parent node and its child node are connected to each other in the relationship between an AP and a non-AP STA at the MAC layer level. FIG. 14 assumes a case where a route is not established between some of the relay nodes. More specifically, in FIG. 14, connections indicated with solid lines show that exchanges of DIO messages for DIS messages and DAO messages for DIS messages have been completed. Connections indicated with dashed lines show that exchanges of DIO messages for DIS messages and DAO messages for DIS messages have not been completed.

For convenience sake, in FIG. 14, each non-AP STA is simply described as an STA. In the following description, relay when an IP packet which is not a control packet for route establishment is transmitted from the wired LAN 13, and when the final destination of the IP packet is the relay node 10b is explained. However, this explanation can be also applied to relay when an IP packet which is not a control packet for route establishment is generated at the relay node 10a, and when the final destination of the IP packet is the relay node 10b.

If the IP packet from the wired LAN 13 is received by the second MAC processor 106 operating as a non-AP STA at the MAC layer level, the relay node 10a performs the series of processes shown in FIG. 9 as described above. As FIG. 14 assumes a case where a route is not established between the relay nodes, normally, the IP packet which is transmitted from the wired LAN 13 and is not a control packet for route establishment is not transferred.

However, the relay node 10a is connected to the relay node 10b which is the destination of the IP packet transmitted from the wired LAN 13 in the relationship between an AP and a non-AP STA at the MAC layer level. Therefore, the AL processor 107a determines that the IP packet should be preferably transferred to the relay node 10b even if a route is not established between the relay nodes and if the IP packet is not a control packet for route establishment. Based on this determination, the AL processor 107a transfers the received IP packet to the first MAC processor 103 operating as an AP at the MAC layer level and connected to the relay node 10b.

The transferred IP packet is converted into a MAC frame by the first MAC processor 103, and is finally transferred to the relay node 10b. Even if a route is not established between the relay nodes, and if the IP packet to be transferred is not a control packet for route establishment, the relay node 10a is capable of transferring the IP packet transmitted from the wired LAN 13 to the relay node 10b which is the final destination.

The arrows in FIG. 14 show how the IP packet transmitted from the wired LAN 13 is transferred to the relay node 10b via the relay node 10a. In this case, as shown with the arrows in FIG. 14, in the relay node 10a, the IP packet is transferred from the second MAC processor 106 operating as a non-AP STA at the MAC layer level to the first MAC processor 103 operating as an AP at the MAC layer level, and subsequently, further transferred to the relay node 10b.

In FIG. 10 to FIG. 14, relay when the IP packet generated at a non-relay node 11 or the IP packet from a wired LAN 13 is transmitted to a relay node 10 was explained. However, there is a case where an IP packet is generated at the IP layer of a relay node 10 and is transmitted to another relay node 10.

In this case, regardless of whether or not a route is established, the relay node 10 which received the IP packet basically does not transfer the IP packet to another node unless the received IP packet is a control packet for route establishment. However, if the destination of the received IP packet is a node connected to the first MAC processor 103 in the own node operating as an AP at the MAC layer level, the relay node 10 may transfer the received IP packet to the first MAC processor 103, and subsequently, further transfer the IP packet to the destination node.

In the present embodiment, a case where the non-AP STA of a downstream relay node 10 is connected to the AP of an upstream relay node 10 at the MAC layer level is exemplarily shown. However, the configuration is not limited to this example. The non-AP STA of an upstream relay node 10 may be connected to the AP of a downstream relay node 10 at the MAC layer level. The relay of an IP packet in this case is explained with reference to FIG. 15.

Figure 15:
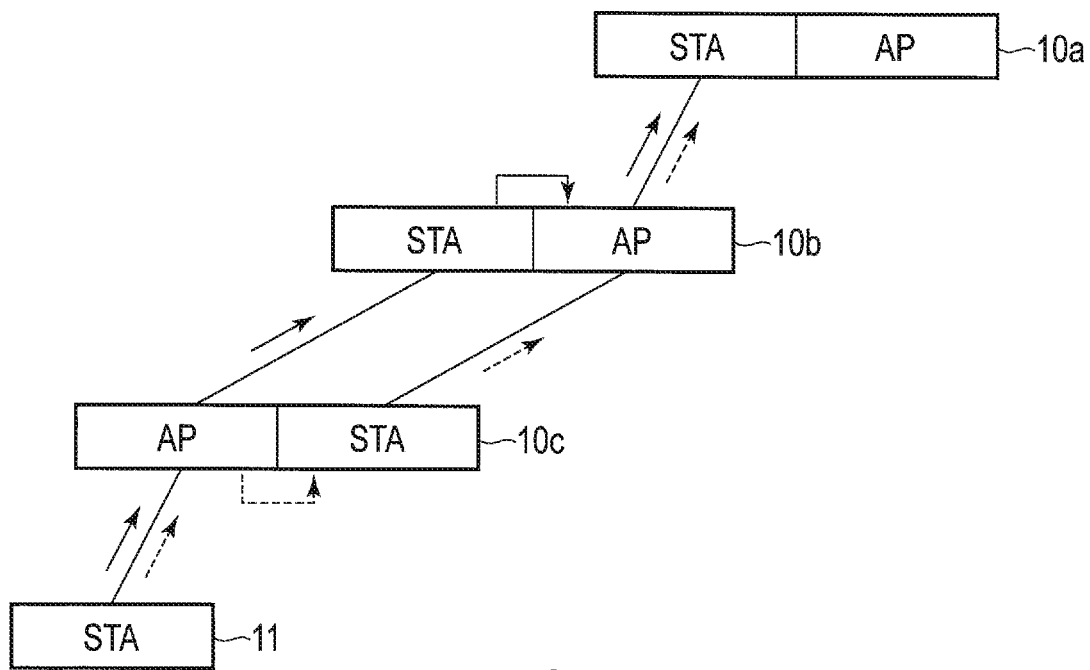
FIG. 15 is another figure showing an example of a mesh network constructed of wireless relay apparatuses according the embodiment.

FIG. 15 exemplarily shows a case where the non-relay node 11 is connected to the mesh network constructed of the relay nodes 10a to 10c. FIG. 15 assumes that the non-AP STA of the relay node 10a equivalent to a root is connected to the AP of the relay node 10b located downstream of the relay node 10a at the MAC layer level. FIG. 15 also assumes that the non-AP STA of the relay node 10b is connected to the AP of the relay node 10c located downstream of the relay node 10b at the MAC layer level, and further, the AP of the relay node 10b is connected to the non-AP STA of the relay node 10c at the MAC layer level. Further, FIG. 15 assumes that the AP of the relay node 10c is connected to the non-relay node 11 located downstream of the relay node 10c at the MAC layer level.

FIG. 15 assumes a case where a route is established between the relay nodes. In the following description, relay when an IP packet in which the final destination is the relay node 10a is generated at the non-relay node 11 is explained. In other words, the relay of an IP packet from the downstream side to the upstream side is explained.

The IP packet generated at the non-relay node 11 is transmitted from the non-relay node 11 to the relay node 10c.

When the IP packet from the non-relay node 11 is received by the first MAC processor 103 operating as an AP at the MAC layer level, the relay node 10c performs the series of processes shown in FIG. 9 as described above. As FIG. 15 assumes that a route is established between the relay nodes, the received IP packet is transferred to another MAC processor.

In this case, the relay node 10c selects the non-AP STA of the relay node 10b or the non-AP STA of the own node as the transfer destination.

When the non-AP STA of the relay node 10b is selected as the transfer destination, the received IP packet is retransferred to the AP of the relay node 10c. The AP of the relay node 10c transfers the retransferred IP packet to the non-AP STA of the relay node 10b. When the non-AP STA of the relay node 10b receives the IP packet transferred from the relay node 10c, the non-AP STA of the relay node 10b transfers the IP packet to the AP of the own node, and finally transfers the IP packet to the relay node 10a which is the destination.

In this way, the IP packet generated at the non-relay node 11 reaches the relay node 10a which is the final destination through the route shown with the solid arrows in FIG. 15.

On the other hand, when the non-AP STA of the own node (the relay node 10c) is selected as the transfer destination, the received IP packet is transferred to the non-AP STA of the own node. The non-AP STA of the relay node 10c further transfers the transferred IP packet to the AP of the relay node 10b. If the AP of the relay node 10b receives the IP packet transferred from the relay node 10c, the AP of the relay node 10b transfers the IP packet to the relay node 10a which is the final destination.

In this way, the IP packet generated at the non-relay node 11 reaches the relay node 10a which is the final destination through the route shown with the dashed arrows in FIG. 15.

Figure 16:
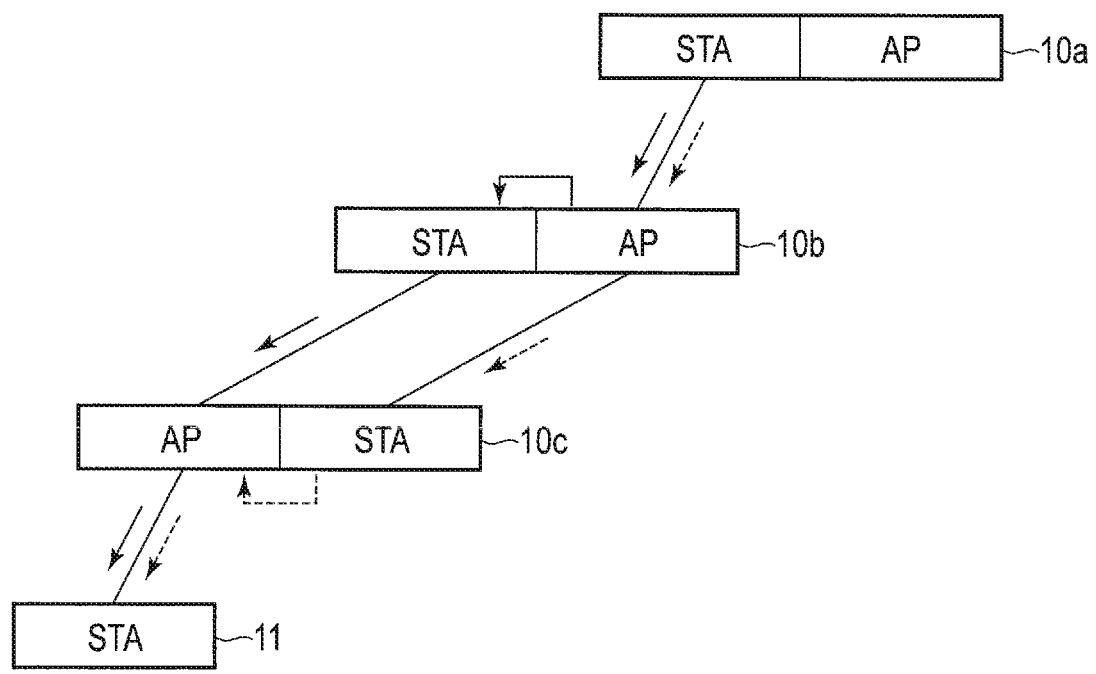
FIG. 16 is another figure showing an example of a mesh network constructed of wireless relay apparatuses according to the embodiment.

FIG. 16 is shown for explaining the relay of an IP packet in which the final destination is the non-relay node 11 in the same mesh network as FIG. 15, in other words, the relay of an IP packet from the upstream side to the downstream side.

In this case, as shown with the solid arrows in FIG. 16, the IP packet transferred from the relay node 10a passes through the AP of the relay node 10b, the non-AP STA of the relay node 10b and the AP of the relay node 10c in order, and is transferred to the non-relay node 11 which is the final destination. Alternatively, as shown with the dashed arrows in FIG. 16, the IP packet transferred from the relay node 10a can pass through the AP of the relay node 10b, the non-AP STA of the relay node 10c and the AP of the relay node 10c in order, and can be transferred to the non-relay node 11 which is the final destination.

As shown with the solid arrows and the dashed arrows in FIG. 15 and FIG. 16, the relay nodes 10 of the present embodiment are also applicable to a mesh network having a plurality of types of routes to the final destination.

FIG. 15 and FIG. 16 assume that a route is established between the relay nodes. However, now, for example, in FIG. 15, it is assumed that a route is not established between the relay nodes. Further, it is assumed that an IP packet is transmitted from the non-relay node 11, and the final destination of the IP packet is the relay node 10b, and further, the IP packet is not a control packet for route establishment. In this case, even if the IP packet which is not a control packet for route establishment is transmitted from the non-relay node 11, as long as the final destination is the relay node 10b, the relay node 10c permits transfer to the relay node 10b as the AP of the relay node 10c is connected to the STA of the relay node 10b at the MAC layer level. If the final destination is a relay node other than the relay node 10b, the relay node 10c does not permit the transfer of the IP packet transmitted from the non-relay node 11.

Similarly, for example, in FIG. 16, it is assumed that a route is not established between the relay nodes. Further, it is assumed that an IP packet is transmitted from (in other words, generated at) the relay node 10b, and the final destination is the non-relay node 11, and further, the IP packet is not a control packet for route establishment. In this case, even if the IP packet which is not a control packet for route establishment is transmitted from the relay node 10b, as long as the final destination is the non-relay node 11, the relay node 10c permits transfer to the non-relay node 11 as the AP of the relay node 10c is connected to the non-relay node 11 at the MAC layer level. Further, if the relay node 10d (not shown) is connected to the non-relay node 11 in parallel with each other at the MAC layer level, the relay node 10c also permits the transfer of an IP packet in which the relay node 10d is the final destination. If the final destination is a relay node other than the non-relay node 11 (or the relay node 10d), the relay node 10c does not permit the transfer of the IP packet transmitted from the relay node 10b.

As shown in FIG. 3, the present embodiment exemplarily shows the configuration in which a single PHY processor is provided for a single MAC processor. However, the configuration is not limited to this example. A single PHY processor may be provided for a plurality of MAC processors. In this case, if the PHY processor receives a MAC frame from a MAC processor, the PHY processor outputs notification indicating that a wireless medium is currently in a busy state to the other MAC processors.

The notification indicating that a wireless medium is in a busy state from the PHY processor to the MAC processors is referred to as a clear channel assessment (CCA) in the IEEE 802.11 standard. The CCA is used to know whether or not a wireless medium is physically used if a carrier sense multiple access with carrier avoidance (CSMA/CA) is implemented.

If the CSMA/CA is carried out, a NAV is used in addition to the above CCA. The NAV refers to a state in which a wireless medium is interpreted as virtually occupied. According to the NAV, by determine an end point for exchanging a MAC frame between an AP and a non-STA in advance, the remaining time from the end of a physical packet to the end point can be set in a MAC header or PHY header of the physical packet. In this configuration, an AP and a non-AP STA which received the MAC frame with the MAC header or the physical packet with the physical header can defer transmission until the end point.

In consideration of the above matters, as the specific method for outputting notification indicating that a wireless medium is in a busy state, the following methods are considered. For example, the PHY processor performs an input as if the MAC frame transmitted from a MAC processor is received in the other MAC processors. Alternatively, the PHY processor notifies the other MAC processors to defer transmission until the above end point.

According to the embodiment explained above, it is possible to provide one of a large number of wireless relay apparatuses constructing a mesh network, and a wireless relay method capable of effectively using the wireless medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless relay apparatus comprising:
a first media control access (MAC) processor connectable to a first wireless apparatus by a first MAC address;
a second MAC processor connectable to a second wireless apparatus by a second MAC address different from the first MAC address; and
a processor which:
determines whether a route for relaying an IP packet via at least one of the first wireless apparatus and the second wireless apparatus is established;
if a first IP packet having data transferred to one of the first wireless apparatus and the second wireless apparatus is received before the route is established, and if a destination of the first IP packet is the first wireless apparatus or the second wireless apparatus, transfers the first IP packet to the first wireless apparatus or the second wireless apparatus; and
if the first IP packet is received before the route is established, and if the destination of the first IP packet is not the first wireless apparatus or the second wireless apparatus, and if the first IP packet is to be further transferred by the first wireless apparatus or the second wireless apparatus, does not transfer the first IP packet to the first wireless apparatus or the second wireless apparatus.

2. The wireless relay apparatus of claim 1, wherein if a second IP packet transferred to one of the first wireless apparatus and the second wireless apparatus and having control information for route establishment is received before the route is established, the processor transfers the second IP packet to the first wireless apparatus or the second wireless apparatus regardless of a destination of the second IP packet.

3. The wireless relay apparatus of claim 2, wherein if the first IP packet or the second IP packet is received before the route is established, and if a transmission source of the first IP packet or the second IP packet is the first wireless apparatus, and if the destination of the first IP packet or the second IP packet is the second wireless apparatus, the processor transfers the first IP packet or the second IP packet to the second wireless apparatus.

4. The wireless relay apparatus of claim 2, wherein if the first IP packet or the second IP packet is received after the route is established, the processor transfers the first IP packet or the second IP packet to the first wireless apparatus or the second wireless apparatus.

5. The wireless relay apparatus of claim 2, wherein the processor determines whether the IP packet is the first IP packet or the second IP packet based on a protocol field of an IP header of the IP packet.

6. The wireless relay apparatus of claim 5, wherein:
the processor determines that the IP packet is the second IP packet if a routing protocol is an IPv6 routing protocol for low-power and lossy networks (RPL), and if a value of the protocol field is 58, and the processor determines that the IP packet is the first IP packet if the routing protocol is the RPL, and if the value of the protocol field is not 58.

7. The wireless relay apparatus of claim 5, wherein:
the processor determines that the IP packet is the second IP packet if a routing protocol is an open shortest path first (OSPF), and if a value of the protocol field is 89, and
the processor determines that the IP packet is the first IP packet if the routing protocol is the OSPF, and if the value of the protocol field is not 89.

8. The wireless relay apparatus of claim 1, wherein the processor deletes the first IP packet which is not transferred to the first wireless apparatus or the second wireless apparatus.

9. The wireless relay apparatus of claim 1, further comprising a memory which stores the first IP packet,
wherein the processor stores the first IP packet which is not transferred to the first wireless apparatus or the second wireless apparatus in the memory, obtains the first IP packet from the memory after the route is established, and transfers the first IP packet to the first wireless apparatus or the second wireless apparatus.

10. The wireless relay apparatus of claim 1, wherein one of the first MAC processor and the second MAC processor operates as an access point, and the other one of the first MAC processor and the second MAC processor operates as a non-access point.

11. A wireless relay method comprising:
performing connection to a first wireless apparatus by a first media access control (MAC) address;
performing connection to a second wireless apparatus by a second MAC address different from the first MAC address;
determining whether a route for relaying an IP packet via at least one of the first wireless apparatus and the second wireless apparatus is established;
if a first IP packet having data transferred to one of the first wireless apparatus and the second wireless apparatus is received before the route is established, and if a destination of the first IP packet is the first wireless apparatus or the second wireless apparatus, transferring the first IP packet to the first wireless apparatus or the second wireless apparatus; and
if the first IP packet is received before the route is established, and if the destination of the first IP packet is not the first wireless apparatus or the second wireless apparatus, and if the first IP packet is to be further transferred by the first wireless apparatus or the second wireless apparatus, not transferring the first IP packet to the first wireless apparatus or the second wireless apparatus.

12. The wireless relay method of claim 11, further comprising:
if a second IP packet transferred to one of the first wireless apparatus and the second wireless apparatus and having control information for route establishment is received before the route is established, transferring the second IP packet to the first wireless apparatus or the second wireless apparatus regardless of a destination of the second IP packet.

13. The wireless relay method of claim 12, further comprising:
transferring the first IP packet or the second IP packet to the second wireless apparatus if the first IP packet or the second IP packet is received before the route is established, and if a transmission source of the first IP packet or the second IP packet is the first wireless apparatus, and if the destination of the first IP packet or the second IP packet is the second wireless apparatus.

14. The wireless relay method of claim 12, further comprising:
   transferring the first IP packet or the second IP packet to the first wireless apparatus or the second wireless apparatus if the first IP packet or the second IP packet is received after the route is established.

15. The wireless relay method of claim 12, further comprising:
   determining whether the IP packet is the first IP packet or the second IP packet based on a protocol field of an IP header of the IP packet.

16. The wireless relay method of claim 15, further comprising:
   determining that the IP packet is the second IP packet if a routing protocol is an IPv6 routing protocol for low-power and lossy networks (RPL), and if a value of the protocol field is 58, and
   determining that the IP packet is the first IP packet if the routing protocol is the RPL, and if the value of the protocol field is not 58.

17. The wireless relay method of claim 15, further comprising:
   determining that the IP packet is the second IP packet if a routing protocol is an open shortest path first (OSPF), and if a value of the protocol field is 89, and
   determining that the IP packet is the first IP packet if the routing protocol is the OSPF, and if the value of the protocol field is not 89.

18. The wireless relay method of claim 11, further comprising:
   deleting the first IP packet which is not transferred to the first wireless apparatus or the second wireless apparatus.

19. The wireless relay method of claim 11, further comprising:
   storing the first IP packet which is not transferred to the first wireless apparatus or the second wireless apparatus in a memory, obtaining the first IP packet from the memory after the route is established, and transferring the first IP packet to the first wireless apparatus or the second wireless apparatus.

20. The wireless relay method of claim 11, wherein one of the first MAC address and the second MAC address operates as an access point, and the other one of the first MAC address and the second MAC address operates as a non-access point.

* * * * *